United States Patent
Ackley (10) Patent No.: US 9,773,324 B1
(45) Date of Patent: Sep. 26, 2017

(54) SYSTEMS AND METHODS FOR IDENTIFYING TARGETS ON A DISPLAY

(71) Applicant: Disney Enterprises, Inc., Burbank, CA (US)

(72) Inventor: Jonathan M. Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/078,743

(22) Filed: Mar. 23, 2016

(51) Int. Cl.
| | |
|---|---|
| G06T 11/00 | (2006.01) |
| H04N 1/60 | (2006.01) |
| H04N 5/202 | (2006.01) |
| H04N 1/40 | (2006.01) |
| G09G 5/02 | (2006.01) |
| G09G 5/06 | (2006.01) |
| A63F 13/25 | (2014.01) |
| A63F 13/52 | (2014.01) |

(52) U.S. Cl.
CPC ............ *G06T 11/001* (2013.01); *A63F 13/25* (2014.09); *A63F 13/52* (2014.09)

(58) Field of Classification Search
CPC combination set(s) only.
See application file for complete search history.

(56) References Cited

U.S. PATENT DOCUMENTS

| | | | |
|---|---|---|---|
| 7,933,431 B2 | 4/2011 | Pryor | |
| 8,401,343 B2 | 3/2013 | Braun | |
| 8,768,007 B2 | 7/2014 | Schamp | |
| 8,781,152 B2 | 7/2014 | Momeyer | |
| 8,872,923 B2 | 10/2014 | Gottwals | |
| 9,050,530 B2 | 6/2015 | Simak | |
| 2004/0078299 A1* | 4/2004 | Down-Logan | G06Q 30/0601 705/26.1 |
| 2007/0165254 A1* | 7/2007 | Kuriyama | G01J 3/524 358/1.9 |
| 2008/0216695 A1* | 9/2008 | Ozaki | B41F 31/045 101/484 |
| 2009/0264204 A1 | 10/2009 | Kang | |
| 2012/0075331 A1* | 3/2012 | Mallick | G06T 11/001 345/594 |
| 2012/0190455 A1 | 7/2012 | Briggs | |
| 2013/0083003 A1 | 4/2013 | Perez | |

(Continued)

OTHER PUBLICATIONS

UK Paten Application GB 25108411 A, Application No. 1222786.4, Filing Date: Dec. 12, 2012.

*Primary Examiner* — Wesner Sajous
(74) *Attorney, Agent, or Firm* — Farjami & Farjami LLP (57) ABSTRACT

There is provided a system including a memory and a processor configured to display targets on a display, each target having at least one target color, receive an input signal transmitted by a user device indicating at least one color value obtained from an image captured by the user device, the image including a portion of one of the targets displayed on the display, compare the color value indicated by the input signal with each of target colors in a target color database, determine the input signal is indicative of a first target of the targets based on a match between the color value indicated by the input signal and one of the target colors in the target color database, and execute an event involving the first target, in response to determining that the input signal is indicative of the first target of the targets.

20 Claims, 4 Drawing Sheets

(56) References Cited

U.S. PATENT DOCUMENTS

| | | |
|---|---|---|
| 2013/0137509 A1 | 5/2013 | Weber |
| 2013/0222371 A1 | 8/2013 | Reitan |
| 2014/0184496 A1 | 7/2014 | Gribetz |
| 2014/0253610 A1* | 9/2014 | Alman .................. G09G 5/026 |
| | | 345/690 |
| 2016/0248942 A1* | 8/2016 | Horita .................. H04N 1/6019 |

* cited by examiner

SYSTEMS AND METHODS FOR IDENTIFYING TARGETS ON A DISPLAY

BACKGROUND

Entertainment venues provide participants with interactive gaming experiences that require significant investment in equipment for the players, including game controllers. Game controllers for location-based interactive gaming typically include a player input device, such as a light gun or the like, to detect each player's interaction with the game. To enable participants to play the game, entertainment venues have to purchase and maintain the game controllers for use by the participants. However, purchasing and maintaining the game controllers for all users can be too expensive for the entertainment venue, and can impact the price of admission and participation for the players.

SUMMARY

The present disclosure is directed to systems and methods for identifying targets on a display, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
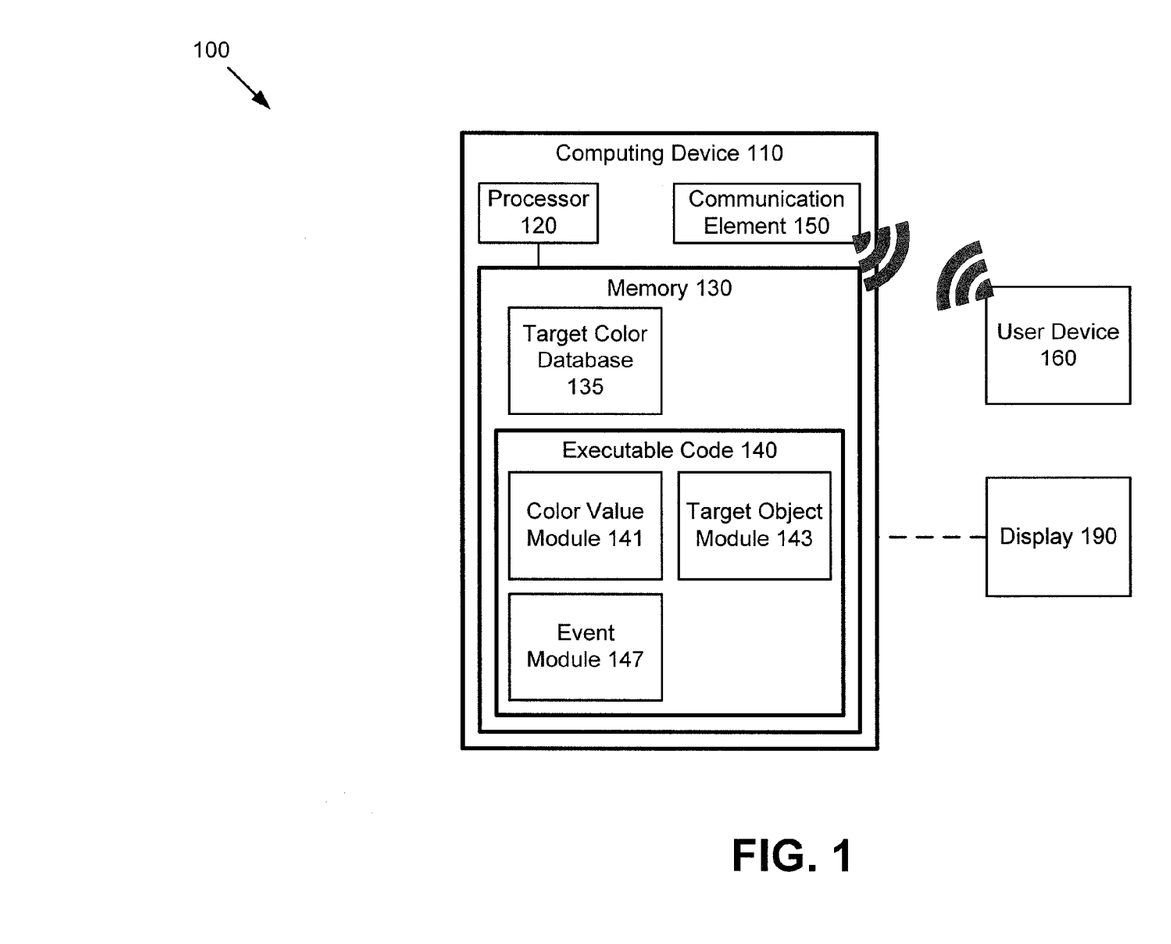
FIG. 1 shows a diagram of an exemplary system for identifying targets on a display, according to one implementation of the present disclosure.

FIG. 1 shows a diagram of an exemplary system for identifying targets on a display, according to one implementation of the present disclosure. System 100 includes computing device 110, user device 160, and display 190. As shown in FIG. 1, user device 160 may be wirelessly connected to computing device 110. Computing device 110 includes processor 120, memory 130, and communication element 150. Processor 120 is a hardware processor, such as a central processing unit (CPU) used in computing devices. Memory 130 is a non-transitory storage device for storing computer code for execution by processor 120, and also storing various data and parameters. Memory 130 includes target color database 135, and executable code 140.

Target color database 135 is a database storing a plurality of color values. In some implementations, target color database 135 may associate the plurality of color values with a corresponding plurality of targets, such that each target is uniquely associated with a color value. In some implementations, target color database 135 may store a range of color values associated with each of the plurality of targets, such that slight variations in the color value will still correspond to the same target. Color values stored in target color database 135 may be red, green, blue (RGB) color values, cyan, magenta, yellow, and black (CMYK) color values, a hue, saturation, and value (HSV) color values, a hexadecimal color values, etc.

In other implementations, target color database 135 may include a plurality of target patterns. Target patterns may include black and white patterns and/or grayscale patterns, and may include a plurality of unique target patterns. For example, target patterns may include a pattern of alternating shapes, such as squares, rectangles, etc., alternating black and white stripes of uniform width, a pattern of stripes having varying widths, etc. In some implementations, target patterns may include complex geometric patterns including rectilinear lines and shapes, curvilinear lines and shapes, etc. Target color database 135 may associate the plurality of target patterns with a corresponding plurality of targets, such that each target is uniquely associated with a target pattern. In some implementations, target color database 135 may include one or more target time code ranges during which each of the plurality of targets appears on display 190, such that the target color and/or pattern of each target has one or more associated target time code ranges that it will be displayed on display 190.

Executable code 140 includes one or more software modules stored in memory 130 for execution by processor 120 of commuting device 110. As shown in FIG. 1, executable code 140 includes color value module 141, target object module 143, and event module 147. Color value module 141 is a software module stored in memory 130 for execution by processor 120 to determine a color value of a portion of an image, such as a red value, a green value, and a blue value of the image resulting in an RGB color value for the image. In some implementations, the color value may be an average of the color of the image, or an average color of a portion of the image. In some implementations, color value module 141 may consider colors of elements of the image within a bounded area of the image. The bounded area may include the entire image, or the bounded area may include less than the entire image. For example, color value module 141 may consider all of the pixels within a bounding box constructed around a target object in the image.

Color value module 141 may average the colors included in an image by adding the component colors of the image and dividing the component colors by the area of the picture, resulting in an RGB value that is the average color for the image. For example, color value module 141 may receive an image having 100 pixels that includes a target that is seventy (70) pixels and thirty (30) background pixels. In some implementations, color value module 141 may only consider the seventy (70) pixels of the target. The target may be defined as being one color, such as a target including seventy (70) pixels each with an RGB value (100-120-80), resulting in a color value of RGB (100-120-80). In other implementations, the target may include a plurality of colors, for example, thirty-five (35) pixels having RGB value (120-130-90) and thirty-five (35) pixels having RGB value (80-110-70), resulting in an average color of RGB (100-120-80). In other implementations, color value module 141 may consider the seventy pixels of the target and the thirty pixels of background. For example, the target may include seventy (70) pixels with RGB value (100-120-80), and thirty (30) background pixels with RGB value (135-206-250), resulting in an average RGB value of (111-146-131). Although the color value, target color, average color, etc., are presently discussed in terms of an RGB color model, any other color model may be utilized, such as a CMYK color model, an HSV color model, a hexadecimal color model, etc. In some implementations, color value module 141 may include colors outside of the visible spectrum, such as infrared light and/or ultraviolet light, in determining a target color and/or target pattern.

Color value module 141 may filter the colors of an image, such as by including a range of colors in the calculation of the color value and/or excluding a range of colors during calculation of the color value. This may allow one or more of the plurality of targets to include more complex designs, colors, and patterns, while still allowing executable code 140 to determine an accurate color value for the image. For example, a target may have a color or a pattern having 50% yellow and 50% blue, and color value module 141 may exclude blue from the color value calculation allowing the target to be defined as a yellow target.

Target object module 143 is a software module stored in memory 130 for execution by processor 120 to associate the color value and/or a target pattern of an image received from user device 160 with a target in target color database 135. In some implementations, target object module 143 may receive a color value and/or a target pattern of an image and compare the color value to target color database 135. Based on the comparison, target object module 143 may determine that the image includes the target associated with the target color and/or target pattern that best matches the color value and/or target pattern of the image. In some implementations, target object module 143 may compare the time at which the target object appeared on the display 190 with the target time code ranges stored in target color database 135. Based on the comparison and determining that the time within one of the target time code ranges, target object module 143 may determine that the image includes the target associated with the target color and/or target pattern that is displayed on display 190 at the time the image was captured.

Event module 147 is a software module stored in memory 130 for execution by processor 120. In some implementations, event module 147 may execute an event in response to target object module 143 determining that an image includes a target. In some implementations, event module 147 may select the target object, may move the target object, may destroy the target object, etc. on display 190. When a target object is selected, event module 147 may alter the appearance of the object on display 190, such as by appearing with a different colored outline, appearing in a different color scheme than when the target object is not selected, etc. When a target object is moved, the target object may be moved on display 190. In some implementations, the user may move the target object by selecting a new location for the target object using camera 272 to select a new location in the scene as it is displayed on display 190. When the target object is destroyed, the target object may be shown to disintegrate on display 190, such as by fading until the target object disappears, by separating into a plurality of pieces and flying apart as though the target object has exploded, etc.

Communication element 150 may be a communication port for connecting computing device 110 to one or more other devices, such as user device 160. In some implementations, communication element 150 may be configured to receive a communication cable, such as a universal serial bus (USB) cable, Firewire cable, Ethernet cable, telephone cable, HDMI cable, video game control cable, etc. In other implementations, communication element 150 may enable wireless communications, such that computing device 110 may be wirelessly connected to various computing devices, such as user device 160, using WiFi, cellular, Bluetooth®, Bluetooth® Low Energy (BLE), etc.

User device 160 may be a handheld communication device capable of capturing images shown on display 190. In some implementations, user device 160 may be a mobile phone, a tablet, a notebook, and the like, capable of communicating with computing device 110. User device 160 may include a camera for capturing images shown on display 190, and may transmit the captured images or information obtained from the captured images to computing device 110. For example, user device 160 may capture images of one or more targets displayed on display 190. In some implementations, user device 160 may transmit or stream a video of display 190 or information relating to the video to computing device 110.

Display 190 may be a television, a computer display, a display of a tablet computer, a projection screen, such as a movie screen or an in-home projection screen. Display 190 may show images from computing device 110. For example, computing device 110 may show a video game on display 190. In some implementations, the video game may include a plurality of target objects. Computing device 110 may display the target objects on display 190. Display 190 may display target objects including target colors in the visible spectrum and/or wavelengths outside the visible spectrum, such as infrared light and ultraviolet light.

Figure 2:
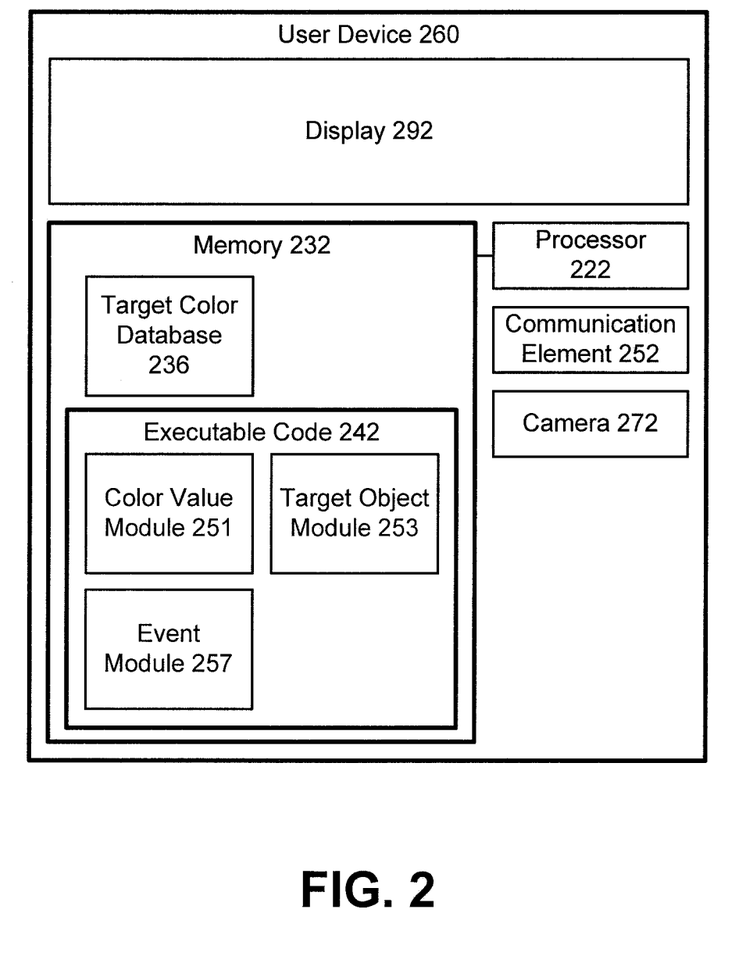
FIG. 2 shows a diagram of an exemplary user device for use with the system of FIG. 1, according to one implementation of the present disclosure.

FIG. 2 shows a diagram of an exemplary user device for use-in system 100 of FIG. 1, according to one implementation of the present disclosure. User device 260 includes processor 222, memory 232, communication element 252, camera 272, and display 292. User device 260 may be a mobile phone, a tablet, or any other wired or wireless device. Processor 222 is a hardware processor, such as a CPU used in computing devices. Memory 232 is a non-transitory storage device for storing computer code for execution by processor 222, and also storing various data and parameters. Memory 232 may include target color database 236, and executable code 242.

Target color database 236 is a database storing a plurality of color values. In some implementations, target color database 236 may associate the plurality of color values with a corresponding plurality of targets, such that each target is uniquely associated with a color value. In some implementations, target color database 236 may store a range of color values associated with each of the plurality of targets, such that slight variations in the color value will still correspond to the same target. Color values stored in target color database 236 may be red, green, blue (RGB) color values, cyan, magenta, yellow, and black (CMYK) color values, a hue, saturation, and value (HSV) color values, a hexadecimal color values, etc.

In other implementations, target color database 236 may include a plurality of target patterns. Target patterns may include black and white patterns and/or grayscale patterns, and may include a plurality of unique target patterns. For example, target patterns may include a pattern of alternating shapes, such as squares, rectangles, etc., alternating black and white stripes of uniform width, a pattern of stripes having varying widths, etc. In some implementations, target patterns may include complex geometric patterns including rectilinear lines and shapes, curvilinear lines and shapes, etc. Target color database 236 may associate the plurality of target patterns with a corresponding plurality of targets, such that each target is uniquely associated with a target pattern. In some implementations, target color database 236 may include one or more target time code ranges indicating various times at which each of the plurality of targets appears on display 190, such that the target color and/or pattern of each target has one or more associated target time code ranges during which the target will be displayed on display 190.

Executable code 242 includes one or more software modules stored in memory 232 for execution by processor 222 of user device 260. As shown in FIG. 2, executable code 242 includes color value module 251, target object module 253, timeline module 255, and event module 257. Color value module 251 is a software module stored in memory 232 for execution by processor 222 to determine a color value of a portion of an image, such as a red value, a green value, and a blue value of the image resulting in an RGB color value for the image. In some implementations, the color value may be an average of the color of the image, or an average color of a portion of the image. In some implementations, color value module 251 may consider colors of elements of the image within a bounded area of the image. The bounded area may include the entire image, or less than the entire image. For example, color value module 251 may consider all of the pixels within a bounding box constructed around a target object in the image. In some implementations, color value module 251 may include colors outside of the visible spectrum, such as infrared light and/or ultraviolet light, in determining a target color and/or target pattern.

Target object module 253 is a software module stored in memory 232 for execution by processor 222 to associate the color value and/or a target pattern of an image captured using camera 272 with a target in target color database 135 and/or color database 236. In some implementations, target object module 253 may receive a color value and/or a target pattern of an image from color value module 251 and compare the color value and/or a target pattern to target color database 135 and/or color database 236. Based on the comparison, target object module 251 may determine that the image includes the target associated with the target color and/or a target pattern that best matches the color value of the image. In some implementations, target object module 253 may compare the time at which the target object appeared on the display 190 with the target time code ranges stored in target color database 253. Based on the comparison and determining that the time is within one of the target time code ranges, target object module 253 may determine that the image includes the target associated with the target color and/or target pattern that is displayed on display 190 at the time the image was captured.

Event module 257 is a software module stored in memory 232 for execution by processor 222. In some implementations, event module 257 may execute an event in response to target object module 253 determining that an image includes a target. In some implementations, event module 257 may select the target object, may move the target object, may destroy the target object, etc. on display 292. In other implementations, event module 257 may transmit a signal to computing device 110 and event module 147 may execute the event on display 190.

Communication element 252 is for communicatively connecting user device 260 to one or more other devices, such as computing device 110. In some implementations, communication element 252 may be configured to receive a communication cable such as a universal serial bus (USB) port, Firewire port, Ethernet cable port, telephone cable port, HDMI port, video game control port, etc. In other implementations, communication element 252 may enable wireless communications, such that user device 260 may be wirelessly connected to computing device 110, using WiFi, cellular, Bluetooth®, Bluetooth® Low Energy (BLE), etc. Communication element 252 may be used to transmit an image and/or stream a video to computing device 110, including color data for the image or video. Camera 272 is a camera for capturing an image and/or video of images being shown display 190. The captured image and/or video may include one or more targets displayed on display 190. Display 292 may be a touch screen display. In some implementations, display 292 may be used as a viewfinder for camera 272.

Figure 3:
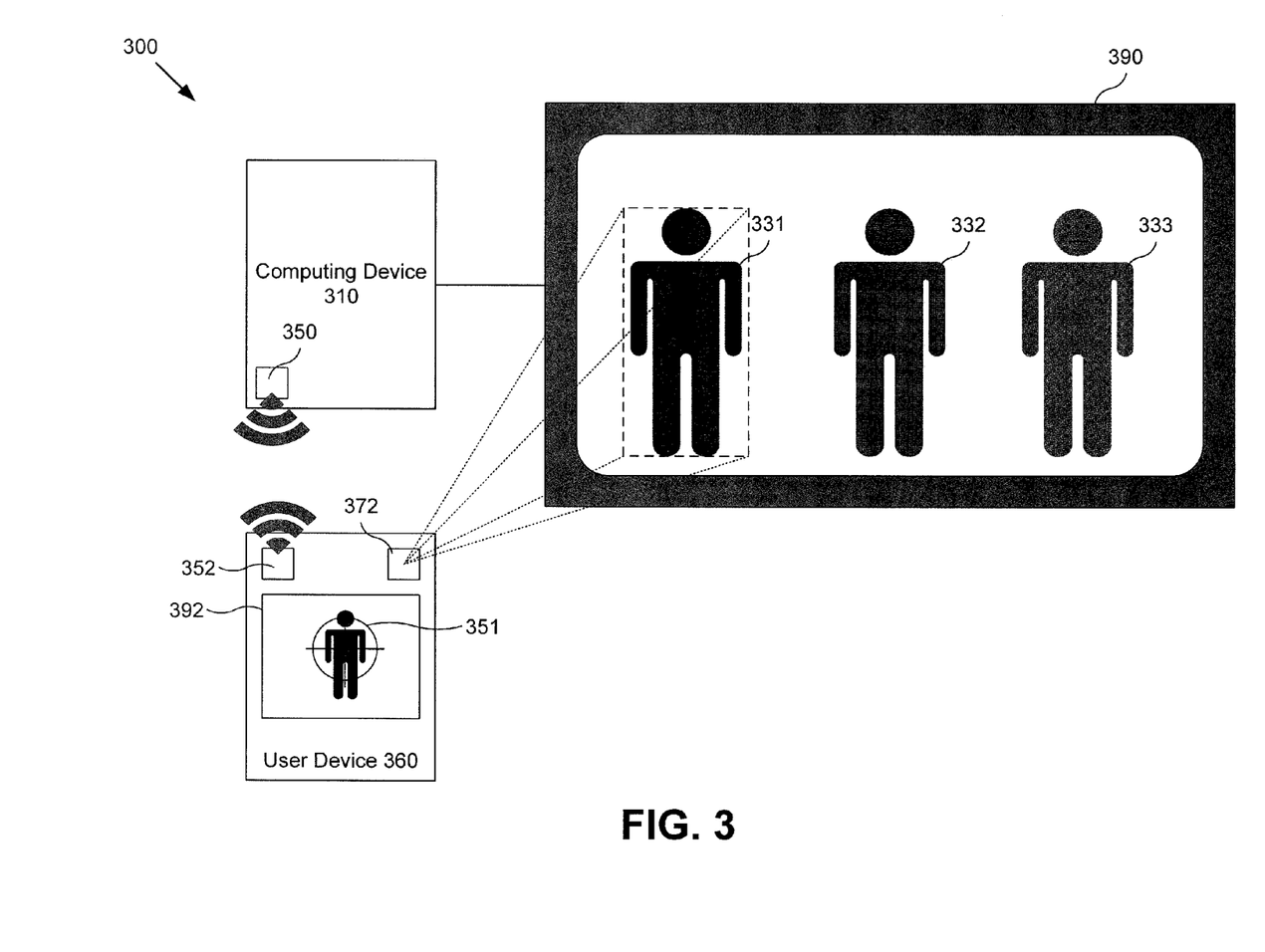
FIG. 3 shows a diagram of an exemplary operation of the system of FIG. 1, according to one implementation of the present disclosure.

FIG. 3 shows a diagram of an exemplary operation of system 100 of FIG. 1, according to one implementation of the present disclosure. System 300 includes computing device 310, display 390, and user device 360. As shown in FIG. 3, computing device 310 is displaying targets 331, 332, and 333, each having a unique target color, on display 390. A user (not shown) of user device 360 positions user device 360 such that reticle 351 covers target 331, in whole or in part, being shown on display 392. The user may then operate user device 360, such as by touching a touch screen interface of display 392, to capture an image of target 331 using camera 372.

In some implementations, user device 360 may process the image of target 331 to determine a color value of target 331. User device 360 may transmit a signal to computing device 310 using communication element 350, where the signal includes the color value of target 331 determined by color value module 251. In some implementations, user device 360 may transmit a signal to computing device 310 using communication element 350, where the signal includes the captured image of target 331, such that computing device 310 may determine the color value of target 331 using color value module 141.

Figure 4:
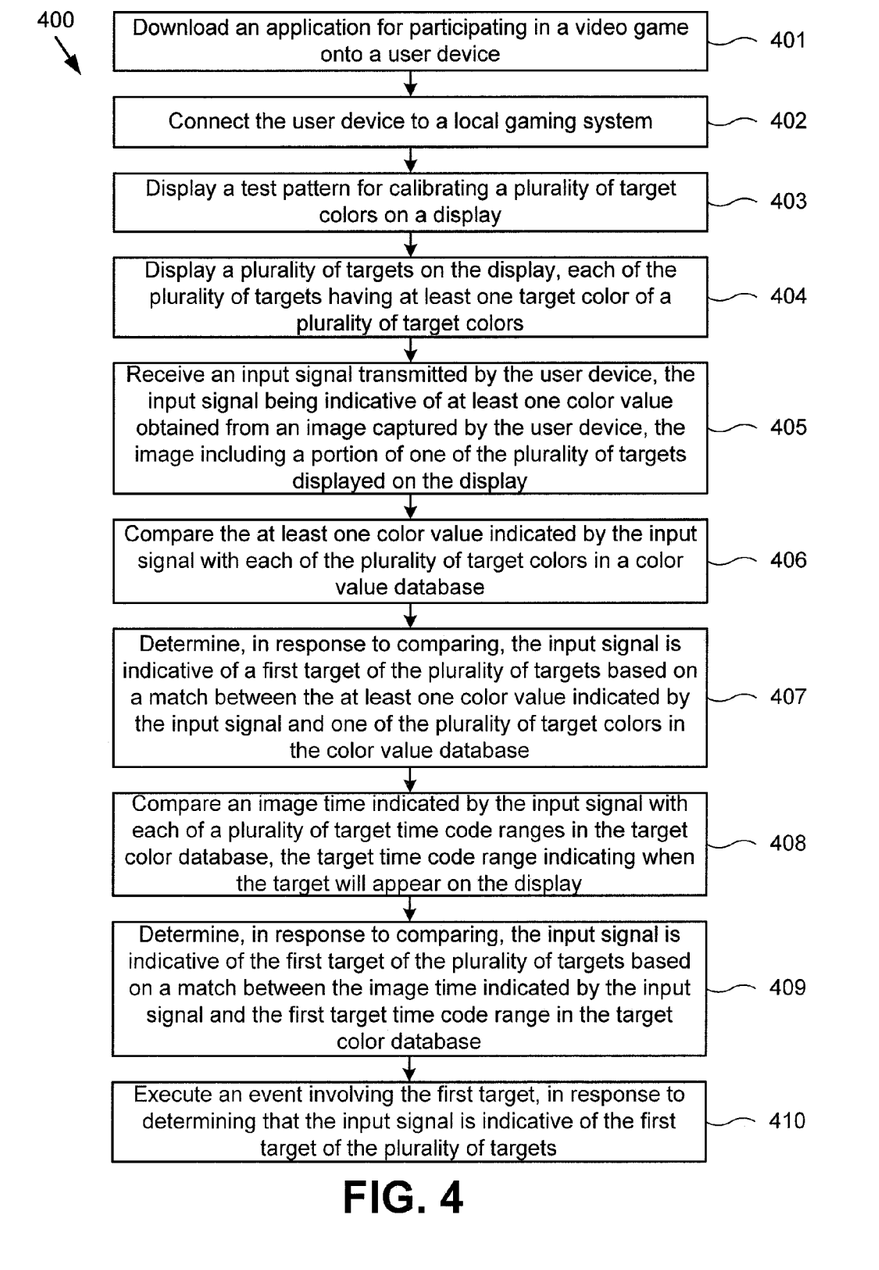
FIG. 4 shows a flowchart illustrating an exemplary method of identifying targets on a display, according to one implementation of the present disclosure.

FIG. 4 shows a flowchart illustrating an exemplary method of identifying targets on a display, according to one implementation of the present disclosure. Method 400 begins at 401, where user device 160 downloads an application for participating in a video game. In some implementations, the application may include a plurality of game modules to run locally on user device 160, such as color value module 251, target object module 253, event module 257, etc. Method 400 continues at 402, where user device 160 may connect to the local gaming system, e.g. computing device 110, using a wired connection or a wireless connection. In some implementations, connecting to computing device 110 includes requesting an authorization from computing device 110 and receiving authorization before connecting to computing device 110.

At 403, executable code 140 displays a test pattern on display 190 for calibrating a plurality of target colors. In some implementations, user device 160 may capture an image of the test pattern for use by color value module 141 and/or color value module 251 to calibrate the target colors to colors as they appear when displayed on display 190. The calibration may allow system 100 to adjust for different lighting conditions, color variation due to different display technologies, or other external factors that may affect the appearance of colors on display 190.

At 404, executable code 140 displays a plurality of targets on display 190, each of the plurality of targets having at least one target color of a plurality of target colors. In some implementations, the plurality of targets may include targets in a video game, for example, alien invaders the user is trying to stop. Each target may include one or more colors, including at least one target color, and each target may be a different color than the other targets.

At 405, executable code 140 receives an input signal transmitted by a user device, the input signal being indicative of at least one color value obtained from an image captured by the user device, the image including a portion of one of the plurality of targets displayed on display 190. In some implementations, the input signal may include an image time indicating a time at which the user device 160 captured the image. User device 160 may capture the image of the portion of one of the plurality of targets displayed on display 190 in response to a user activating camera 272. For example, the user may view the field of view of camera 272 on display 292, and the display may include a target reticle that the user may position over one of the targets to aim camera 272. To activate camera 272, the user may press a button on user device 260, or the user may touch display 292, which may be a touch screen. In some implementations, the user may indicate which target to capture using camera 272 and activate camera 272 at the same time by touching display 292, and camera 272 may capture an image centered on the user's touch.

The image captured by camera 272 may include one or more targets. In some implementations, user device 260 may transmit the image captured by camera 272 to computing device 110, including color data and/or pattern data related to the image captured by camera 272. Color value module 141 may determine a color value of the image received from camera 272. In other implementations, user device 260 may process the image captured by camera 272 using color value module 251 to determine a color value of the image, and user device 260 may transmit the color value to computing device 110. In some implementations, the color value may be the color of one of the targets displayed on display 190, or the color value may be an average color of a portion of the image captured by camera 272. In other implementations, the color value module 141 and/or color value module 251 may process the image captured by camera 272 to determine a unique pattern of the image and transmit the pattern data to target module 143 and/or target module 253.

At 406, executable code 140 compares the at least one color value indicated by the input signal with each of the plurality of target colors in target color database 135. Target color database may include a color value corresponding to each target displayed on display 190. In some implementations, target object module 143 may compare the color value of the portion of the image captured by camera 272 with the color values stored in color database 135. Method 400 continues at 407, where executable code 140 determines, in response to comparing, the input signal is indicative of a first target of the plurality of targets based on a match between the at least one color value indicated by the input signal and one of the plurality of target colors in the target color database. In some implementations, the color value of the input signal may not precisely match an entry in target color database 135.

Target object module 143 may search for a color value in target color database 135 that is within a range of the color value of the input signal. If more than one target color stored in target color database 135 is within the range of the color value of the input signal, target object module 143 may determine which target color is closer to the color value of the input signal. For example, target module 143 may search for a target color in target color database 135 that is within 5% variance from the color value of the input signal, and target color database 135 may include a first target color that is 1% different than the color value of the input signal and a second target color that is 4% different than the color value of the input signal. In response to the color value of the input signal, target module 143 would determine that the input signal indicates the target corresponding to the first target color in target color database 135.

At 408, executable code 140 compares an image time indicated by the input signal with each of a plurality of target time code ranges in the target color database, indicating when the first target appears on the display. In some implementations, the image time may be included in the image captured by camera 272, such as when a game time is displayed on display 190. In other implementations, the image time may be the time at which camera 272 captures the image and may be recorded using an internal clock of user device 160. In such an implementation, computing device 110 may compare the image time of the input signal with an internal time of computing device 110. The internal time of user device 160 may be synchronized with the internal time of computing device 110, for example, during the step of calibrating the colors, any discrepancy between the internal time of user device 160 and the internal time of computing device 110 may be recorded for use in determining the image time. In other implementations, executable code 140 may compare the image time with a game time of the video game that the user is playing.

At 409, executable code 140 determines, in response to comparing, the input signal is indicative of the first target of the plurality of targets based on a match between the image time indicated by the input signal and one of the plurality of target time code ranges in target color database 135. In some implementations, determining the presence of the target color indicated by the input signal at the image time may allow executable code 140 to filter out false positive target color recognitions and may allow the same or substantially similar target color to be used for more than one target of the plurality of targets, provided that the appearance on display 190 of different targets having substantially similar target colors are separated by sufficient time, such as half of one second, one second, etc.

Method 400 continues at 410, where executable code 140 executes an event involving the first target, in response to determining that the input signal is indicative of the first target of the plurality of targets. In some implementations, event module 147 may select the first target displayed on display 190, move the first target, destroy the first target, etc. In some implementations, executable code 140 may not execute the event involving the first target until the presence of the first target on display 190 has been verified using the color value and image time.

When a target object is selected, event module 147 may alter the appearance of the first target on display 190, such as by displaying the first target with a different colored outline, a different color scheme than when the first target is not selected, etc. When the first target is moved, the first target may be moved on display 190. In some implementations, the user may move the first target using camera 272 to select a new location in the scene as it is displayed on display 190. When the first target is destroyed, the first target may be shown to disintegrate on display 190, such as by fading until the first target disappears, by separating into a plurality of pieces and flying apart as though the first target has exploded, etc. In other implementations, the first target may be collected and counted as a prize captured by the user.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code and a target color database including a plurality of target colors;
a display; and
a hardware processor executing the executable code to:
 display a plurality of targets on the display, each of the plurality of targets having at least one target color of the plurality of target colors;
 receive an input signal transmitted by a user device, the input signal being indicative of at least one color value obtained from an image captured by the user device, the image including a portion of one of the plurality of targets displayed on the display;
 compare the at least one color value indicated by the input signal with each of the plurality of target colors in the target color database;
 determine, in response to comparing, the input signal is indicative of a first target of the plurality of targets based on a match between the at least one color value indicated by the input signal and one of the plurality of target colors in the target color database; and
 execute an event involving the first target, in response to determining that the input signal is indicative of the first target of the plurality of targets.

2. The system of claim 1, wherein the input signal includes one of a video stream targets displayed on the display and a still image of the targets displayed on the display transmitted by the user device.

3. The system of claim 1, wherein the color value is an average color of the portion of one of the plurality of targets displayed on the display.

4. The system of claim 3, wherein the color value is calculated by the user device prior to transmitting the input signal.

5. The system of claim 3, wherein the hardware processor further executes the executable code to:
calculate the color value based on the image including a portion of one of the plurality of targets displayed on the display.

6. The system of claim 1, wherein, prior to displaying the plurality of targets on the display, the hardware processor executes the executable code to:
display a test pattern for calibrating the plurality of target colors.

7. The system of claim 1, wherein the event is one of selecting the first target, moving the first target, and destroying the first target.

8. The system of claim 1, wherein the user device is a mobile phone.

9. The system of claim 1, wherein the color value is a target pattern.

10. The system of claim 1, wherein the target color database further includes a plurality of target time code ranges including a first target time code range during which the first target appears on the display, and wherein the processor further executes the executable code to:
 compare an image time indicated by the input signal with each of the plurality of target time code ranges in the target color database indicating when the first target appears on the display; and
 determine, in response to comparing, the input signal is indicative of the first target of the plurality of targets based on a match between the image time indicated by the input signal and the first target time code range in the target color database.

11. A method for use with a system comprising a display, a non-transitory memory, and a hardware processor, the method comprising:
 displaying, using the hardware processor, a plurality of targets on the display, each of the plurality of targets having at least one target color;
 receiving, using the hardware processor, an input signal transmitted by a user device, the input signal being indicative of at least one color value obtained from an image captured by the user device, the image including a portion of one of the plurality of targets displayed on the display;
 comparing, using the hardware processor, the at least one color value indicated by the input signal with each of a plurality of target colors in a target color database;
 determining, using the hardware processor, in response to comparing, the input signal is indicative of a first target of the plurality of targets based on a match between the at least one color value indicated by the input signal and one of the plurality of target colors in the target color database; and
 executing, using the hardware processor, an event involving the first target, in response to determining that the input signal is indicative of the first target of the plurality of targets.

12. The method of claim 11, wherein the input signal includes one of a video stream targets displayed on the display and a still image of the targets displayed on the display transmitted by the user device.

13. The method of claim 11, wherein the color value is an average color of the portion of one of the plurality of targets displayed on the display.

14. The method of claim 13, wherein the color value is calculated by the user device prior to transmitting the input signal.

15. The method of claim 13, further comprising:
 calculating, using the hardware processor, the color value based on the image including a portion of one of the plurality of targets displayed on the display.

16. The method of claim 11, wherein, prior to displaying the plurality of targets on the display, the method further comprises:
 display, using the hardware processor, a test pattern for calibrating the plurality of target colors.

17. The method of claim 11, wherein the event is one of selecting the first target, moving the first target, and destroying the first target.

18. The method of claim 11, wherein the user device is a mobile phone.

19. The method of claim 11, wherein the color value is a target pattern.

20. The method of claim 11, wherein the target color database further includes a plurality of target time code ranges including a first target time code range during which the first target appears on the display, the method further comprising:

comparing, using the hardware processor, an image time indicated by the input signal with each of the plurality of target time code ranges in the target color database indicating when the first target appears on the display; and determining, using the hardware processor, in response to comparing, the input signal is indicative of the first target of the plurality of targets based on a match between the image time indicated by the input signal and the first target time code range in the target color database.

* * * * *